United States Patent
Maloney

(10) Patent No.: US 7,178,721 B2
(45) Date of Patent: *Feb. 20, 2007

(54) METHOD AND SYSTEM FOR DUPLICATE COMMERCIAL PAPER DETECTION

(75) Inventor: Rian R. Maloney, Plano, TX (US)

(73) Assignee: VECTORsgi, Inc., Addsion, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/349,666

(22) Filed: Feb. 8, 2006

(65) Prior Publication Data

US 2006/0124730 A1 Jun. 15, 2006

Related U.S. Application Data

(63) Continuation of application No. 10/993,628, filed on Nov. 19, 2004, now Pat. No. 7,028,886.

(51) Int. Cl.
*G06F 17/00* (2006.01)
*G06F 19/00* (2006.01)
*G06Q 40/00* (2006.01)

(52) U.S. Cl. .................. 235/375; 235/379; 705/45

(58) Field of Classification Search ............... 235/375, 235/379; 705/16, 35, 39, 44, 45, 64
See application file for complete search history.

(56) References Cited

U.S. PATENT DOCUMENTS

| | | | |
|---|---|---|---|
| 4,083,635 A | 4/1978 | Reed, Jr. | |
| 5,265,007 A | 11/1993 | Barnhard, Jr. et al. | |
| 5,583,759 A | 12/1996 | Geer | |
| 5,680,611 A | 10/1997 | Rail et al. | |
| 5,689,579 A | 11/1997 | Josephson | |
| 5,717,868 A | 2/1998 | James | |
| 5,748,780 A | 5/1998 | Stolfo | |
| 5,910,988 A | 6/1999 | Ballard | |
| 5,930,778 A | 7/1999 | Geer | |
| 6,019,282 A | 2/2000 | Thompson et al. | |
| 6,026,175 A | 2/2000 | Munro et al. | |
| 6,032,137 A | 2/2000 | Ballard | |
| 6,170,744 B1 | 1/2001 | Lee et al. | |
| 6,181,814 B1 | 1/2001 | Carney | |
| 6,212,504 B1 | 4/2001 | Hayosh | |
| 6,301,379 B1 | 10/2001 | Thompson et al. | |
| 6,547,129 B2 | 4/2003 | Nichols et al. | |

(Continued)

OTHER PUBLICATIONS

Notification of Transmittal, International Search Report and Written Opinion (forms PCT/ISA/210,PCT/ISA/220, and PCT/ISA/237) for PCT/US2005/041996, mailed Apr. 5, 2006, 13 pages.

(Continued)

*Primary Examiner*—Thien M. Le
*Assistant Examiner*—April A. Taylor
(74) *Attorney, Agent, or Firm*—Fish & Richardson P.C.

(57) ABSTRACT

In one embodiment, software for detecting duplicate commercial paper transactions implements a method to identify a check identification code, such as a Magnetic Ink Character Recognition (MICR) code, from a commercial paper transaction, with the check identification code comprising a plurality of fields. The software determines a hash value based on at least a portion of the plurality of fields and verifies the authenticity of the MICR code based, at least in part, on the determined hash value.

29 Claims, 3 Drawing Sheets

U.S. PATENT DOCUMENTS

| | | |
|---|---|---|
| 6,600,823 B1 | 7/2003 | Hayosh |
| 6,728,397 B2 | 4/2004 | McNeal |
| 7,028,886 B1 * | 4/2006 | Maloney .................. 235/375 |
| 2002/0174074 A1 | 11/2002 | Meadow |
| 2003/0074327 A1 | 4/2003 | Meadow et al. |
| 2003/0159046 A1 | 8/2003 | Choi et al. |
| 2003/0225705 A1 | 12/2003 | Park et al. |
| 2004/0260636 A1 | 12/2004 | Marceau et al. |
| 2005/0015317 A1 | 1/2005 | Rodriguez et al. |
| 2005/0033690 A1 | 2/2005 | Antognini et al. |
| 2005/0033696 A1 | 2/2005 | Kallin |

OTHER PUBLICATIONS

"Banking's Role in Tomorrow's Payments System—Payments System Overview," vol. II, Furash & Company, Jun. 1994, 162 pages.

* cited by examiner

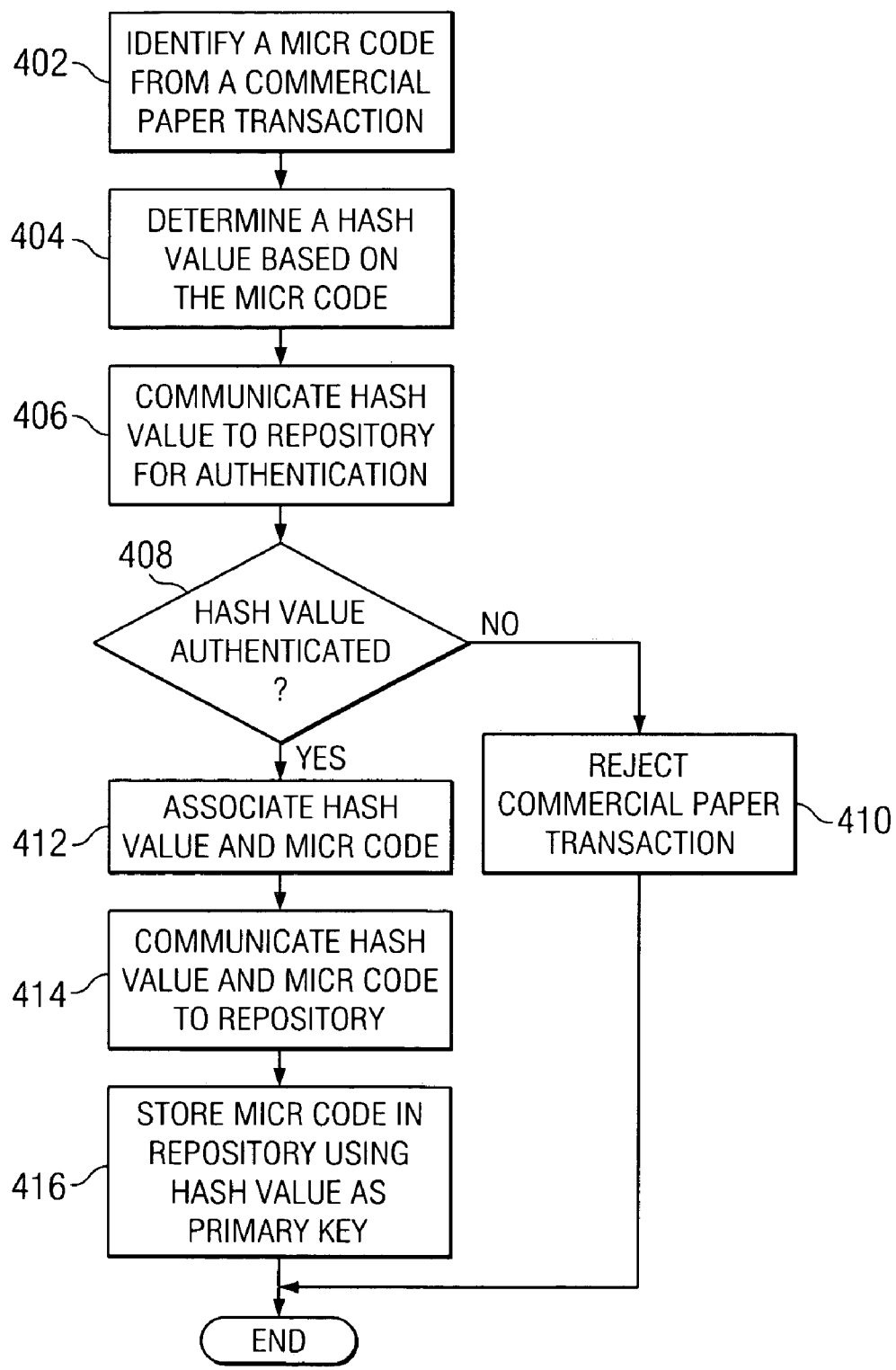

METHOD AND SYSTEM FOR DUPLICATE COMMERCIAL PAPER DETECTION

RELATED APPLICATION

This application is a continuation of U.S. application Ser. No. 10/993,628 filed Nov. 19, 2004 now U.S. Pat. No. 7,028,886, entitled, "Method and System for Duplicate Commercial Paper Detection."

TECHNICAL FIELD

This invention relates to commercial paper processing and, more specifically, to a method and system for detecting duplicate commercial paper transactions.

BACKGROUND

When a commercial paper transaction, such as a purchase using a check, typically occurs, the check is forwarded to a bank for processing. This processing may include scanning, sorting, and other physical and electronic handling of the checks or other similar items. The bank may generate one or more Automated Clearing House (ACH) or other similar communications based on the processing of checks from multiple account holders or points-of-sale. The bank sends the ACH communications to the appropriate recipient banks, often through a posting system, to conduct the appropriate debit and credit transactions in the associated demand deposit account (DDA).

SUMMARY

This disclosure provides a system and method for detecting duplicate commercial paper transactions. In one embodiment, for example, software for processing check identification codes is operable to identify a check identification code from a commercial paper transaction, with the check identification code comprising a plurality of fields. The software determines a hash value based on at least a portion of the plurality of fields and verifies the authenticity of the check identification code based, at least in part, on the determined hash value. The details of one or more embodiments of the invention are set forth in the accompanying drawings and the description below. One or more embodiments of the invention may include several important technical advantages. For example, the disclosure may describe a more efficient national repository that ensures that duplicate checks are not fully processed. In another example, the disclosure may allow a point-of-sale to refuse a duplicate check before handing over the purchased product. Of course, various embodiments of the invention may have none, some or all of these advantages. Other features, objects, and advantages of the invention will be apparent from the description and drawings, as well as from the claims.

DESCRIPTION OF DRAWINGS

FIG. 4 is a flowchart illustrating an example method for detecting duplicate commercial paper transactions in accordance with one embodiment of the present disclosure.

DETAILED DESCRIPTION

Figure 1:
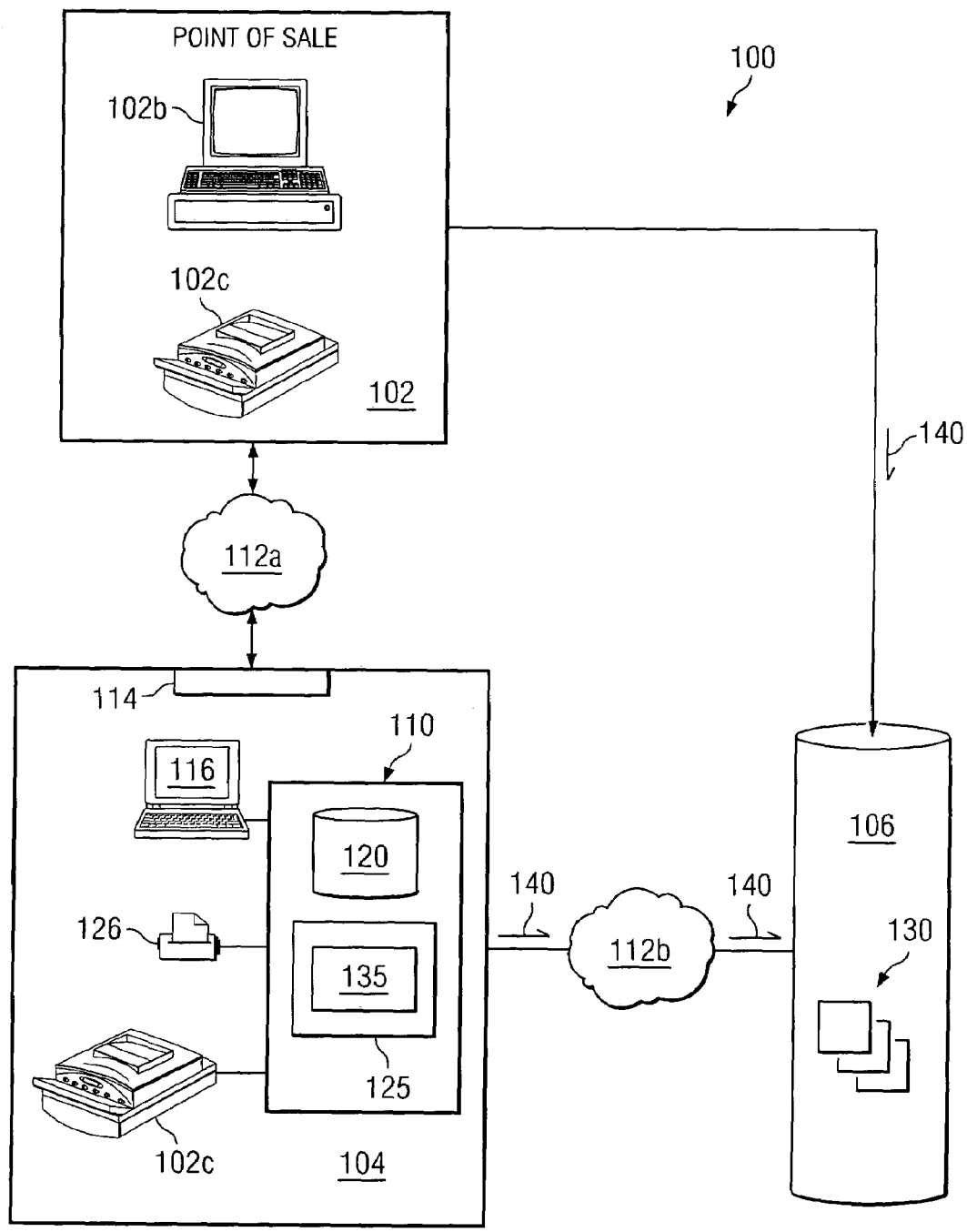
FIG. 1 illustrates a system for detecting duplicate commercial paper transactions in accordance with one embodiment of the present disclosure.

FIG. 1 illustrates a system 100 for detecting duplicate commercial paper transactions in accordance with one embodiment of the present disclosure. Generally, system 100 includes any financial or banking system operable to process commercial paper transactions (such as checking) and automatically detect if a particular one of the transactions is a duplicate. For example, system 100 may capture check identification data 140 (such as a Magnetic Ink Character Recognition (MICR) code or a MICR line) from each transaction, generate a hash value from at least a portion of check identification data 140, and compare the hash value to each of a plurality of hash values associated with check identification data 140 for previously processed transactions. Therefore, system 100 may avoid or quickly rectify fraudulent or erroneous transactions. It will be understood that each check identification data 140 may be in any appropriate format including E13-B, CMC-7, output from Optical Character Recognition (OCR), as well as others. Check identification data 140 typically includes a plurality of fields including routing/transit field, account field, serial field, and others. It will be further understood that various components of system 100 may use or implement any suitable hashing technique or algorithm, such as MD-5 or proprietary, to determine the hash value (or other similar identifier) based on at least a portion (including all) of the fields in check identification data 140. In certain embodiments, check identification data 140 may comprise a single data unit or number with a plurality of sub-fields. Also, each determined hash value may comprise the same byte-size, regardless of the particular data used to generated such a value.

System 100 is typically distributed into at least one receiving entity (or point-of-sale) 102 and one or more financial institutions 104. System 100 may further include a regional or nationwide repository 106, which may store a number of already processed transactions. Often, system 100 is electronically inter-coupled, thereby allowing efficient communications among the various components. But system 100 may be a standalone processing environment or any other suitable banking environment without departing from the scope of this disclosure. The term "dynamically," as used herein, generally means that certain processing is determined, at least in part, at run-time based on one or more variables. The term "automatically," as used herein, generally means that the appropriate processing is substantially performed by at least part of system 100. It should be understood that "automatically" further contemplates any suitable user or manager interaction with system 100 without departing from the scope of this disclosure.

Receiving entity 102 is any original recipient or payee of the commercial paper transaction. Receiving entity 102 may be a store, an online vendor, a telephony system, or others. Receiving entity 102 may also represent a teller at financial institution 104 without departing from the scope of the disclosure. In the illustrated embodiment, receiving entity 102 includes a cash register 102b and a scanner/sorter 102c. Of course, receiving entity 102 may not include either of these, may be include an interconnected or combined cash register 102b and scanner 102c, or may include additional components for processing transactions. Scanner/sorter 102c is any suitable device operable to capture or otherwise obtain information from a physical transaction, such as a check. For example, scanner 102c may include a digital camera for generating electronic images of the checks and a MICR reader for capturing MICR data (or other identification data 140) from the checks. The example digital camera may record an image of the front and back of each check in black and white, grayscale, and/or color. This image may be in any suitable format including Moving Picture Experts Group (MPEG), Joint Photographic Experts Group (JPEG), Tag Image File Format (TIFF), including any suitable version thereof (such as TIFF 6.0), and others. Receiving entity 102 may also be operable to generate an Automated Clearing House (ACH) transaction based on the commercial paper transaction. While not illustrated, receiving entity 102 may also include all or a portion of check processing engine 135 (described below), or other similar financial application, as financial institution 104.

Financial institution 104 is any agent, third-party resource, clearing house, branch, processing center, or central office of a financial institution. In the illustrate embodiment, financial institution 104 includes server 110, printer 126, and scanner 128. Printer 126 is any device operable to generate a hard copy from an electronic image. For example, financial institution 104 may include a plurality of commercial paper transactions in electronic form, which may then printed as image replacement documents (IRDs) using printer 126. Scanner 128 may be any device capable of capturing or otherwise obtaining information from a physical transaction, such as a check, and generating an electronic image. In other words, scanner 128 may be similar to scanner 102c.

Server 110 includes memory 120 and processor 125 and comprises an electronic computing device operable to receive, transmit, process, and store data associated with system 100 and, more specifically, financial institution 104. For example, server 110 may be any computer or processing device such as, for example, a blade server, general-purpose personal computer (PC), Macintosh, workstation, Unix-based computer, or any other suitable device. Generally, FIG. 1 provides merely one example of computers that may be used with the disclosure. For example, although FIG. 1 illustrates one server 110 that may be used with the disclosure, system 100 can be implemented using computers other than servers, as well as a server pool. In other words, the present disclosure contemplates computers other than general purpose computers as well as computers without conventional operating systems. As used in this document, the term "computer" is intended to encompass a personal computer, workstation, network computer, or any other suitable processing device. Server 110 may be adapted to execute any operating system including Linux, UNIX, Windows Server, or any other suitable operating system. According to one embodiment, server 110 may also include or be communicably coupled with a web server and/or a secure financial server.

Memory 120 may include any memory or database module and may take the form of volatile or non-volatile memory including, without limitation, magnetic media, optical media, random access memory (RAM), read-only memory (ROM), removable media, or any other suitable local or remote memory component. In certain embodiments, memory 120 may include any appropriate data such as an audit log, electronic images of commercial paper transactions, account information, administration profiling, and others. Indeed, while illustrated separately, memory 120 may include all or a portion of repository 106.

Server 110 also includes processor 125. Processor 125 executes instructions and manipulates data to perform the operations of server 110 such as, for example, a central processing unit (CPU), a blade, an application specific integrated circuit (ASIC), or a field-programmable gate array (FPGA). Although FIG. 1 illustrates a single processor 125 in server 110, multiple processors 125 may be used according to particular needs and reference to processor 125 is meant to include multiple processors 125 where applicable. In the illustrated embodiment, processor 125 executes check processing engine 135, which performs at least a portion of the analysis of each commercial paper transaction in an attempt to locate duplicate transactions using hash values.

Check processing engine 135 could include any hardware, software, firmware, or combination thereof operable to, among other things, automatically detect duplicate or already processed transactions by generating and comparing hash values from at least portion of each transaction's identifying information. For example, check processing engine 135 may be written or described in any appropriate computer language including C, C++, Java, Perl, Visual Basic, assembler, any suitable version of 4GL, and others or any combination thereof. It will be understood that while check processing engine 135 is illustrated in FIG. 1 as a single multi-tasked module, the features and functionality performed by this engine may be performed by multiple modules such as, for example, an image generation module, a processing module, and an administration module. Further, while illustrated as internal to server 110, one or more processes associated with check processing engine 135 may be stored, referenced, or executed remotely. Moreover, check processing engine 135 may be a child or sub-module of another software module (not illustrated) without departing from the scope of this disclosure. In one embodiment, check processing engine 135 may include or be communicably coupled with an administrative workstation or graphical user interface (GUI) 116. For example, the workstation may comprise a computer that includes an input device, such as a keypad, touch screen, mouse, or other device that can accept information, and an output device that conveys information associated with the operation of server 110, receiving entity 102, or repository 106, including digital data, visual information, or GUI 116. Both the input device and output device may include fixed or removable storage media such as a magnetic computer disk, CD-ROM, or other suitable media to both receive input from and provide output to users through the display, namely GUI 116.

GUI 116 comprises a graphical user interface operable to allow the user of the workstation to interface with at least a portion of system 100 for any suitable purpose. Generally, GUI 116 provides the user of the workstation with an efficient and user-friendly presentation of data provided by or communicated within system 100. GUI 116 may comprise a plurality of customizable frames or views having interactive fields, pull-down lists, and buttons operated by the user. In one embodiment, GUI 116 presents reports that includes the various quarantine email information and associated buttons and receives commands from the user via one of the input devices. In an alternative embodiment, GUI 116 may be hidden or not implemented without departing from the scope of the disclosure. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in system 100 and efficiently presents the results to the user. Server 110 can accept data from the workstation via the web browser (e.g., Microsoft Internet Explorer or Netscape Navigator) and return the appropriate HTML or XML responses using network 112.

Server 110 may also include interface 114 for communicating with other computer systems or components, such as repository 106, over network 112 in a client-server or other distributed environment. In certain embodiments, server 110 receives electronic images of checks from internal or external senders through interface 114 for storage in memory 120 and/or processing by processor 125. Generally, interface 114 comprises logic encoded in software and/or hardware in a suitable combination and operable to communicate with network 112. More specifically, interface 114 may comprise software supporting one or more communications protocols associated with communications network 112 or hardware operable to communicate physical signals.

Network 112 facilitates wireless or wireline communication between computer server 110 and any other local or remote computer or component, such as repository 106. Indeed, while illustrated as two networks, 112a and 112b respectively, network 112 may be a continuous network without departing from the scope of this disclosure, so long as at least portion of network 112 may facilitate communications between the requisite parties or components. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Repository 106 is any intra-bank, inter-bank, regional, or nationwide or substantially national electronic storage facility, data processing center, or archive that allows for one or a plurality of financial institutions 104 (as well as receiving entities 102) to dynamically determine if a particular commercial paper transaction has already been processed or if the particular commercial paper transaction is a duplicate. For example, repository 106 may be a central database communicably coupled with points-of-sale 102 and financial institutions 104. Repository 106 may be physically or logically located at any appropriate location including in one of the financial institutions 104 or off-shore, so long as it remains operable to store information associated with a plurality of transactions, such as in illustrated all items file 130.

All items file 130 include any parameters, variables, fields, algorithms, rules, and other data for allowing financial institutions 104 or points-of-sale 102 to identify duplicate commercial paper transactions. For example, all items file 130 typically store a plurality of records, with each record including at least a hash value generated from at least a portion of the MICR code (or other identifier) associated with a one of a plurality of commercial paper transactions. In one embodiment, all items file 130 may comprise one or more tables stored in a relational database described in terms of SQL statements or scripts. In this and other similar embodiments, each record 131 may be associated with a particular MICR code or line, with the determined hash value comprising the primary key. The primary key allows for quick access and location and helps ensure that duplicates are not completely processed. In another embodiment, all items file 130 may store or define various data structures as text files, extensible Markup Language (XML) documents, Virtual Storage Access Method (VSAM) files, flat files, Btrieve files, comma-separated-value (CSV) files, internal variables, or one or more libraries. In short, all items file 130 may comprise one table or file or a plurality of tables or files stored on one computer or across a plurality of computers in any appropriate format. Moreover, all items file 130 may be local or remote to repository 106 without departing from the scope of this disclosure and store any type of appropriate data.

In one aspect of operation of one embodiment, receiving entity 102 first conducts a commercial paper transaction with a customer. Receiving entity 102 may then capture a check identification data 140 of the transaction using scanner 102c to determine the bank routing number, the customer's account number, the check number, and other suitable information. In this case, receiving entity 102 may then determine a hash value of check identification data 140 in an effort to detect if the check (or other commercial paper) is a duplicate. This hash value is then communicated to repository 106 to determine if another transaction has been processed with the same hash value. If so, it is likely (if not proof positive) that the transaction is a duplicate. Otherwise, receiving entity 102 may then proceed to process the transaction as a probable unique transaction. For example, receiving entity 102 may automatically generate an ACH transaction based on the check. Once receiving entity 102 has suitably processed the transaction, it communicates information associated with the transaction, such as the physical check or an electronic image, to financial institution 104. Receiving entity 102 may, alternatively or in combination, communicate captured check identification data 140 and the determined associated hash value to financial institution 104 for further verification.

After financial institution 104 receives at least a portion of the information, financial institution 104 may capture check identification data 140 and generate a hash value based on, for example, the MICR code. If point-of-sale 104 communicates check identification data 140 and the associated hash value, financial institution 104 may compute a second hash value based on the received MICR code and compare the second has value to the received hash value to verify that the transaction has not been tampered with. Financial institution 104 then communicates the hash value to repository 106 to determine if repository 106 already includes this hash value (or an identical transaction). It will be understood that financial institution 104 may perform this step regardless of whether a similar step was performed by receiving entity 102—this may, for example, help ensure the detection of two duplicate transactions that were processed by two different points-of-sale 102 at substantially the same time. At any suitable point during processing, repository 106 may automatically store the hash value (as well as any desired suitable portion of check identification data 140).

Figures 2, 3:
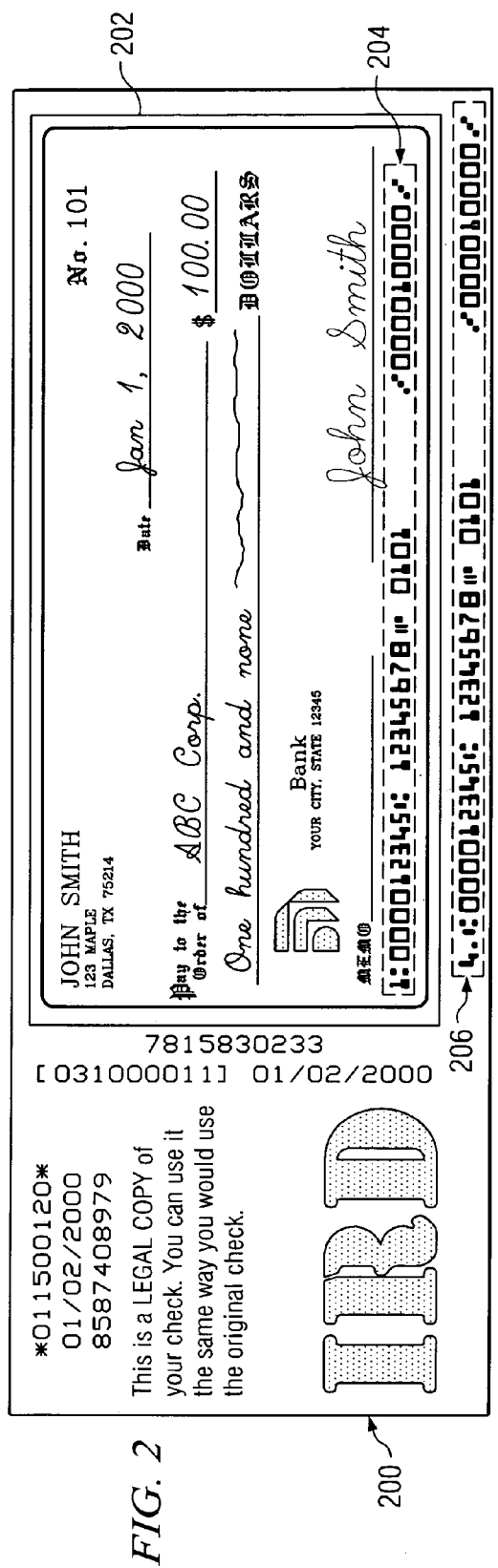
FIG. 2 illustrates one embodiment of an example commercial paper transaction used by the system of FIG. 1.
FIG. 3 illustrates a portion of an example all items file used by the system in FIG. 1.

FIG. 2 illustrates one embodiment of an example commercial paper transaction 202 used by the system of FIG. 1. In this embodiment, commercial paper transaction 202 is illustrated as a portion of an IRD 200, which may be considered a legal representation of transaction 202. Transaction 202 is associated with two MICR codes 204 and 206, each generated or captured at different points during transaction processing. For example, MICR code 204 may be preprinted on the check prior to the actual transaction. In this example, MICR code 204 includes a type indicator of "1," a routing number of "12345," an account number of "12345678," and a check number of "101." In this example, MICR code 204 has been supplemented with the captured amount, "100.00," perhaps at the receiving entity 102 or the financial institution 104 of first deposit. MICR code 206 is substantially similar to MICR code 204, with the difference involving the type indicator. In MICR code 204, the type indicator is "1", while MICR code 206 includes a type indicator of "4."

FIG. 3 illustrates a portion of an example all items file 130 used by one embodiment of system 100 in FIG. 1. As described above, system 100 may use all items file 130 to store and process check identification data 140 from commercial paper transactions. All items file 130 is a multi-dimensional data structure that includes at least one MICR record 131. Each MICR record 131 includes multiple columns 132. In the illustrated embodiment, each MICR record 131 includes hash value, a type identifier, serial or check number, and amount. The hash value is automatically determined by receiving entity 102 or financial institution 104 and is used as the primary key (or a unique identifier) for locating or storing the record. The auxiliary on-us field is typically a check number used for commercial or corporate checks. The routing/transit number typically indicates i) the Federal Reserve District from which the transaction should be cleared; ii) the Federal Reserve Bank or Branch serving the area where the recipient financial institution 104 is located; and iii) identifies the number assigned to the recipient financial institution 104 by the American Bankers Association. The on-us field (or account number and serial number fields) include the check writer's account number at the payor financial institution 104 and, in the case of personal checks, may include the check number. The amount field includes the MICR version of the transaction amount and is normally encoded by the financial institution 104 of first deposit. It will be understood that the illustrated fields are for example purposes only and one or more these fields may not be in all items file 130 without departing from the scope of this disclosure. Indeed, in one embodiment, each MICR record 131 may consist of only the hash value, thereby conserving storage space. Moreover, the example records 131 are merely to aid understanding and may not represent certain embodiments.

FIG. 4 is a flowchart illustrating an example method 400 for detecting duplicate commercial paper transactions in accordance with one embodiment of the present disclosure. At a high level, method 400 includes receiving a commercial paper transaction, determining a hash value based on at least a portion of the transaction's MICR code, and comparing the determined hash value to repository 106. The following description focuses on the operation of check processing engine 135 in performing method 400. But system 100 contemplates using any appropriate combination and arrangement of logical elements implementing some or all of the described functionality. For example, receiving entity 102 may implement method 400 without departing from the scope of this disclosure.

Method 400 begins at step 402, where scanner 128 (or scanner 102c) identifies a check identification data 140 from a commercial paper transaction. Check processing engine 135 determines a hash value based on at least part of the identified check identification data 140 at step 404. As described above, check processing engine 135 may determine the hash value using any appropriate technique or via implementing any suitable algorithm, such as MD-5, a proprietary technique, and others. Check processing engine 135 then communicates the determined hash value to repository 106 for authentication at step 406. Next, at decisional step 408, check processing engine 135 determines or otherwise identifies if the check identification data 140 was authenticated using the hash value. For example, check processing engine 135 may receive an error message from repository 106, with the error message indicating that an identical commercial paper transaction has already occurred or has already been stored in repository 106. In another example, check processing engine 135 may receive a message indicating that check identification data 140 is substantially unique from other MICR codes stored in repository 106. If the hash value is not verified at decisional step 408, then check processing engine 135 rejects the commercial paper transaction and illustrated processing ends. If check identification data 140 is authenticated or verified using the hash value at decisional step 408, then check processing engine 135 associates the hash value and check identification data 140 at step 412. Check processing engine 135 then communicates this hash value and check identification data 140 to repository 106. Next, at step 416, check identification data 140 is stored in repository 106 using the hash value as a primary key.

The preceding flowchart and accompanying description illustrate exemplary method 400. In short, system 100 contemplates using any suitable technique for performing this and other tasks. Accordingly, many of the steps in this flowchart may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations, and permutations of these embodiments and methods will be apparent to those skilled in the art. For example, receiving entity 102 may process electronic checks, as well as physical checks and other commercial paper. Accordingly, the above description of example embodiments does not define or constrain this disclosure. Other changes, substitutions, and alterations are also possible without departing from the scope of this disclosure.

What is claimed is:

1. A method for detecting duplicate commercial paper transactions comprising:
   receiving an authenticated commercial paper transaction with a check identification code, the check identification code comprising a plurality of fields and the commercial paper transaction authenticated using a first hash value based on at least a portion of the plurality of fields;
   updating the check identification code because of processing of the received transaction;
   determining a second hash value based on at least a portion of the updated check identification code;
   communicating the second hash value to a repository storing a plurality of hash values, each hash value associated with one authenticated commercial paper transaction;
   if the repository does not include the second hash value as one of the plurality of hash values, authenticating the processed commercial paper transaction; and
   if the repository includes the second hash value as one of the plurality of hash values, identifying the processed commercial paper transaction as a duplicate.

2. The method of claim 1 further comprising, if the processed transaction is not a duplicate, storing the updated check identification code in the repository using the second hash value as a primary key.

3. The method of claim 1, the repository comprising a substantially nationwide MICR archive.

4. The method of claim 1, wherein determining the second hash value based on at least a portion of the check identification code comprises determining the second hash value based on a type indicator, a route and transit number, and an on-us field.

5. The method of claim 1, wherein receiving the authenticated commercial paper transaction with the check identification code comprises electronically receiving the authenticated commercial paper transaction from a third party.

6. The method of claim 5 further comprising electronically receiving the first hash value in a communication separate from the authenticated commercial paper transaction.

7. The method of claim 1, the repository comprising a local repository of hash values and the method further comprising receiving an update of the local repository from a central repository.

8. An image capture system for detecting duplicate commercial paper transactions operable to:
receive an authenticated commercial paper transaction with a check identification code, the check identification code comprising a plurality of fields and the commercial paper transaction authenticated using a first hash value based on at least a portion of the plurality of fields;
update the check identification code because of processing of the received transaction;
determine a second hash value based on at least a portion of the updated check identification code;
communicate the second hash value to a repository storing a plurality of hash values, each hash value associated with one authenticated commercial paper transaction;
if the repository does not include the second hash value as one of the plurality of hash values, authenticate the processed commercial paper transaction; and
if the repository includes the second hash value as one of the plurality of hash values, identify the processed commercial paper transaction as a duplicate.

9. The system of claim 8 further operable to, if the processed transaction is not a duplicate, store the updated check identification code in the repository using the second hash value as a primary key.

10. The system of claim 8, the repository comprising a substantially nationwide MICR archive.

11. The system of claim 8, wherein the image capture system operable to determine the second hash value based on at least a portion of the check identification code comprises the image capture system operable to determine the second hash value based on a type indicator, a route and transit number, and an on-us field.

12. The system of claim 8, wherein the image capture system operable to receive the authenticated commercial paper transaction with the check identification code comprises the image capture system operable to electronically receive the authenticated commercial paper transaction from a third party.

13. The system of claim 8, the repository comprising a local repository of hash values and the system further operable to receive an update of the local repository from a central repository.

14. A method for detecting duplicate commercial paper transactions comprising:
identifying a check identification code from a commercial paper transaction, the check identification code comprising a plurality of fields;
determining a first hash value based on at least a portion of the plurality of fields;
communicating the first hash value to a repository storing a plurality of hash values, each hash value associated with an authenticated commercial paper transaction;
if the repository includes the first hash value as one of the plurality of hash values, identifying the commercial paper transaction as a duplicate;
if the repository does not include the first hash value as one of the plurality of hash values:
authenticating the commercial paper transaction; and
communicating the authenticated transaction to a financial institution, the financial institution operable to update the check identification code based on transaction processing and to authenticate the processed transaction using a second hash value based on at least a portion of the updated check identification code.

15. The method of claim 14 further comprising, if the transaction is authenticated, storing the updated check identification code in the repository using the first hash value as a primary key.

16. The method of claim 14, the repository comprising a substantially nationwide MICR archive.

17. The method of claim 14, wherein determining the first hash value based on at least a portion of the plurality of fields comprises determining the first hash value based on a type indicator, route and transit number, and an on-us field.

18. The method of claim 14, wherein communicating the authenticated commercial paper transaction to the financial institution comprises electronically transmitting the authenticated commercial paper transaction to the financial institution.

19. The method of claim 18 further comprising electronically transmitting the first hash value in a communication separate from the authenticated transaction.

20. The method of claim 18 wherein electronically transmitting the authenticated commercial paper transaction to the financial institution comprises electronically transmitting the authenticated commercial paper transaction to a third party data processor associated with the financial institution.

21. The method of claim 14, the repository comprising a local repository of hash values and the method further comprising receiving an update of the local repository from a central repository.

22. A commercial paper processing system for detecting duplicate commercial paper transactions operable to:
identify a check identification code from a commercial paper transaction, the check identification code comprising a plurality of fields;
determine a first hash value based on at least a portion of the plurality of fields;
communicate the first hash value to a repository storing a plurality of hash values, each hash value associated with an authenticated commercial paper transaction;
if the repository includes the first hash value as one of the plurality of hash values, identify the commercial paper transaction as a duplicate;
if the repository does not include the first hash value as one of the plurality of hash values:
authenticate the commercial paper transaction; and
communicate the authenticated transaction to a financial institution, the financial institution operable to update the check identification code based on transaction processing and to authenticate the processed transaction using a second hash value based on at least a portion of the updated check identification code.

23. The system of claim 22 further operable to, if the transaction is authenticated, store the updated check identification code in the repository using the first hash value as a primary key.

24. The system of claim 22, the repository comprising a substantially nationwide MICR archive.

25. The system of claim 22, wherein the processing system operable to determine the first hash value based on at least a portion of the plurality of fields comprises the processing system operable to determine the first hash value based on a type indicator, route and transit number, and an on-us field.

26. The system of claim 22, wherein the processing system operable to communicate the authenticated commercial paper transaction to the financial institution comprises the processing system operable to electronically transmit the authenticated commercial paper transaction to the financial institution.

27. The system of claim 26 further operable to electronically transmit the first hash value in a communication separate from the authenticated transaction.

28. The system of claim 26 wherein the processing system operable to electronically transmit the authenticated commercial paper transaction to the financial institution comprises the processing system operable to electronically transmit the authenticated commercial paper transaction to a third party data processor associated with the financial institution.

29. The system of claim 22, the repository comprising a local repository of hash values and the method further comprising receiving an update of the local repository from a central repository.

* * * * *